Jan. 23, 1951          C. B. KAMISS          2,539,254
X-RAY CASSETTE HINGE AND BACK
Filed June 18, 1949          2 Sheets—Sheet 1
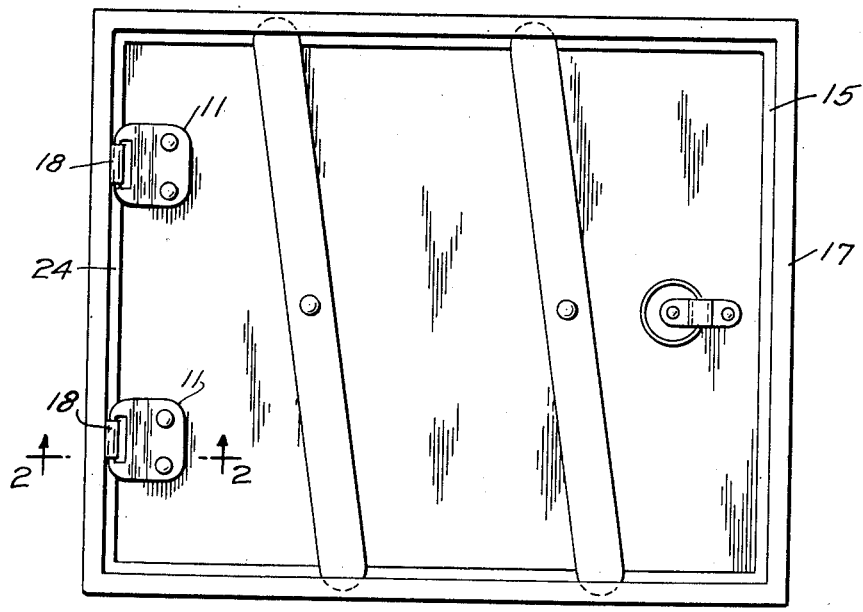
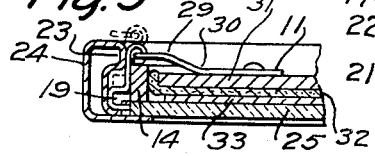 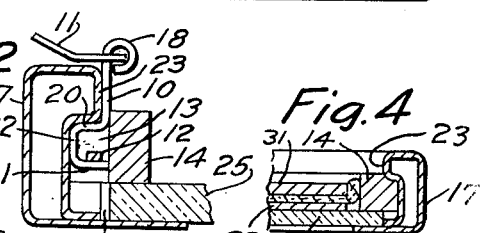 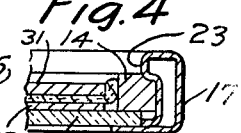
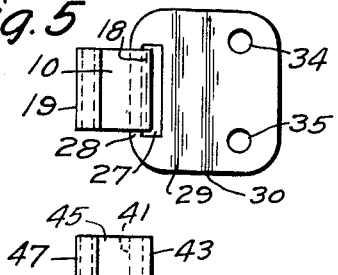 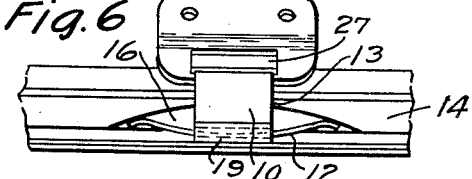
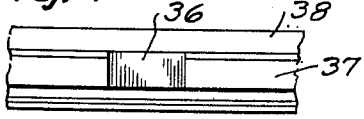
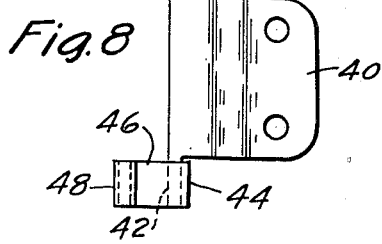
Inventor
CHARLES B. KAMISS
By James Harrison Bowen
ATTORNEY Jan. 23, 1951          C. B. KAMISS          2,539,254
X-RAY CASSETTE HINGE AND BACK
Filed June 18, 1949          2 Sheets-Sheet 2
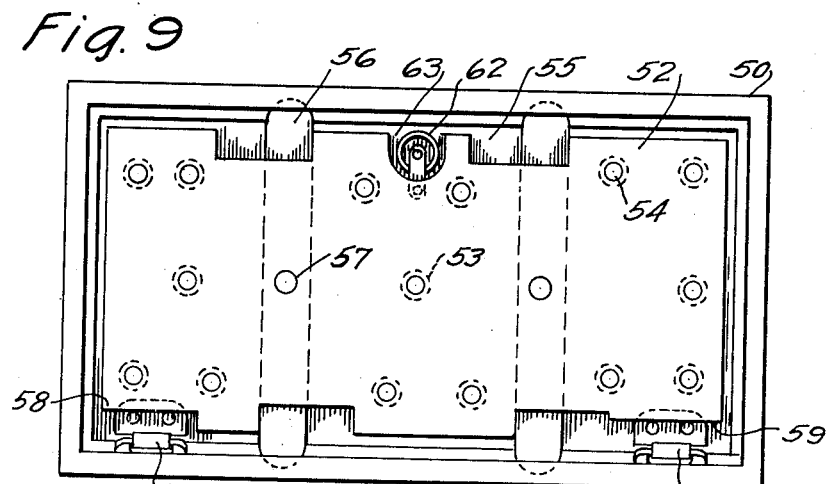
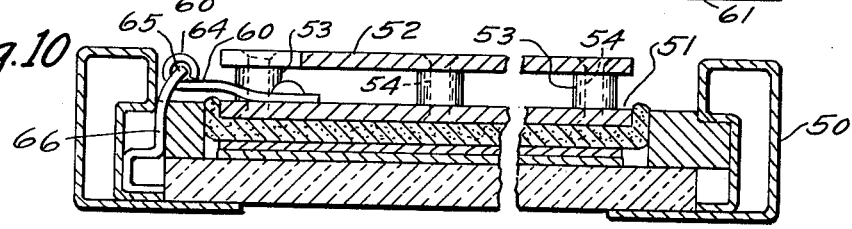
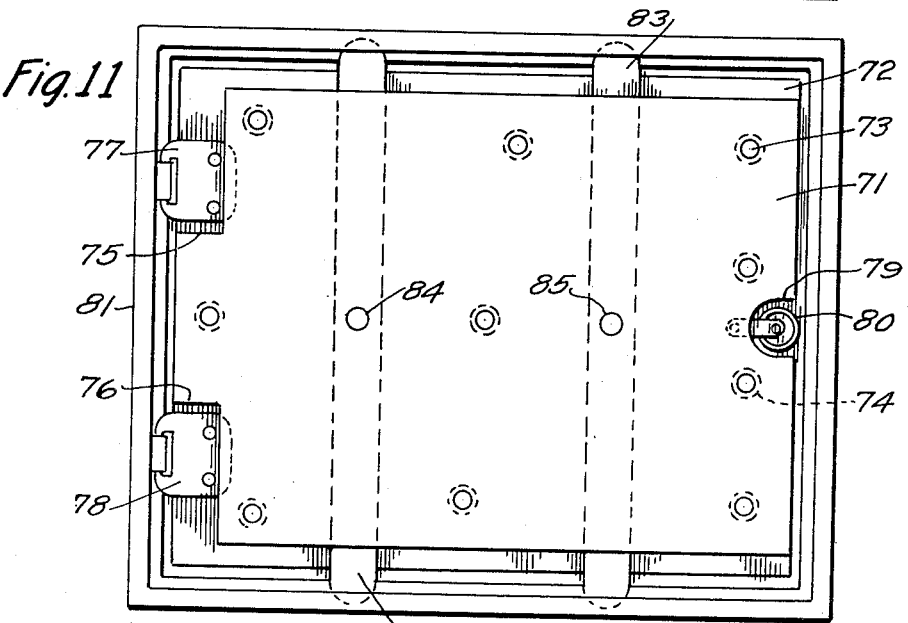
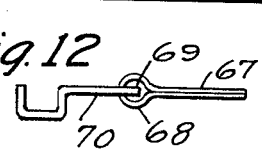
INVENTOR.
CHARLES B. KAMISS
BY
James Harris Bowen
ATTORNEY Patented Jan. 23, 1951

2,539,254

UNITED STATES PATENT OFFICE 2,539,254

X-RAY CASSETTE HINGE AND BACK

Charles B. Kamiss, Jamaica, N. Y.

Application June 18, 1949, Serial No. 100,022

3 Claims. (Cl. 250—68)

This invention relates to cassettes used for holding plates in making X-ray pictures, and in particular an improved hinge for holding the back to the frame and also an improved back that prevents sagging of the plate at the center, the hinge being incorporated in the frame and formed whereby the back opens to a full open position parallel with the frame.

The purpose of this invention is to provide an improved back for cassettes and a hinge therefor wherein the hinge is so constructed that it may be installed without weakening the frame of the cassette, and the back provides a continuous support for the intermediate part of the plate.

This invention is an improvement over the hinge and back of the X-ray Cassette of my Patent No. 2,161,058 of June 6, 1939, in that the spring on the outside of the hinge is eliminated and the back is formed with two spaced plates that increase the thickness thereof without increasing the weight.

Various types of hinges are used on frames of this type but it has been found difficult to design a small compact hinge that does not protrude above the upper surface of the frame, that may be incorporated in the frame and that permits the back to open all of the way. Furthermore, in the cassette of the patent the weight of a patient often causes the unsupported intermediate part of the back to bow or sag downwardly and thereby blur the picture. With these thoughts in mind this invention contemplates a hinge formed with a vertically slidable anchoring member incorporated in a slot in a side bar of the inner frame, and a hinge plate secured to the back of the frame and having a bar pivotally held to the upper end of the anchoring member. A spring may also be used in the frame structure for urging the anchoring member inwardly as the back is closed, and the back may be formed with two spaced plates with the outer surface of the outer plate flush with the rear surface of the frame and with the inner plate supported therefrom by spacing elements.

The object of this invention is, therefore, to provide means for constructing a simple compact hinge for X-ray cassettes which does not protrude beyond the back of the cassette frame and which is so formed that the back of the cassette opens to a full open position parallel with the surface of the frame.

Another object of the invention is to provide a back for an X-ray cassette that is formed with spaced parallel plates with the outer surface of the outer plate flush with the rear surface of the frame.

A further object of the invention is to provide an improved cassette hinge and back which are of simple and economical constructions.

With these and other objects and advantages in view the invention embodies a double wall back for X-ray cassettes wherein the surface of the back is flush with the rear surface of the frame, and a hinge for a cassette frame having an overhanging inner ledge under which an inner frame is positioned, including a vertically slidable base member having a hub on the outer end with a socket on the inner end in which a hinge plate on the back is pivotally held in the hub and the socket fits under the ledge of the frame and locks the hinge members in the frame.

Other features and advantages of the invention will appear from the following description taken in connection with the drawings, wherein:

Figure 1 is a plan view looking toward the rear of a cassette illustrating the hinges with the back in the closed position.

Figure 2 is a cross section taken on line 2—2 of Figure 1 showing the position of the hinge with the back in the full open position.

Figure 3 is a similar section showing the position of the hinge with the back of the cassette closed.

Figure 4 is a similar section through the opposite end of the frame.

Figure 5 is a plan view of the hinge with the base extended outwardly and with other parts omitted.

Figure 6 is a detail looking through the end of the cassette toward the bar of the inner frame, with the adjoining bar or rail of the cassette omitted and showing the rail at the opposite end of the frame.

Figure 7 is a similar view showing a modification in which the spring is omitted and the base of the hinge is retained in a straight slot, the hinge plate and base thereof being omitted.

Figure 8 is a view similar to that shown in Figure 5 showing another modification wherein the hinge plate is provided with outwardly extended pins and the pins, which are stamped from the plate, are held in separate base members, are shown extended outwardly.

Figure 9 is a plan view showing a cassette with a double back.

Figure 10 is a typical cross section through a cassette on an enlarged scale illustrating the construction of a double back and showing a further modification in the construction of the hinge wherein the hub is formed on the hinge plate instead of the support.

Figure 11 is a view similar to that shown in Figure 9 illustrating a double back for a large frame.

Figure 12 is a view showing a further modification in which a hinge plate is formed by bending a plate to form a hub therein.

Referring now to the drawings wherein like reference characters denote corresponding parts the improved cassette hinge of this invention includes a base 10, a hinge plate 11, and a spring 12, and the base plate is slidably held in a vertically disposed slot 13 in a bar 14 of an inner frame 15, with the spring in an arcuate recess 16 in the bar, and the inner frame is positioned in an outer frame 17.

The base 10 is formed with a flat strip of material having a hub 18 at the upper end which extends over the bar 14, as shown in Figures 2 and 3, and the lower end is provided with a horizontally disposed open U-shape socket 19 having an upper side 20, a lower side 21 and a connecting wall 22, and the spring 12 extends through the socket 19 with the ends extended into the recess 16, as shown in Figure 6. As illustrated in Figure 2 the socket 19 extends under the inwardly projecting ledge 23 of the end rail 24 of the frame 17, and with the base of the hinge anchored in the slot of the bar 14 and retained between the bar and rail 24, it is free to slide vertically and positively held in the frame. The Bakelite plate 25 of the cassette is provided with a notch 26 that registers with the slot of the bar 14 to permit the lower side 21 of the socket 19 to pass downwardly into the frame.

The hinge plate 11 is provided with an elongated slot 27 in one side which provides a bar 28 around which the hub 18 is rolled, as shown in Figures 2 and 5, and this plate is offset at the points 29 and 30 to permit the back 31 with the padding 32 to be placed against a plate 33, as shown in Figures 3 and 4. The hinge plate is provided with screw or rivet openings 34 and 35.

The hinge may be used without the spring 12, as the base will slide back into place as the back is closed, and when the spring is omitted the base is held in a slot 36 without the recess 16, as shown in Figure 7, in which the bar of the inner frame is indicated by the numeral 37, and the outer frame by the numeral 38.

In the design shown in Figure 8 a hinge plate 40 is formed with outwardly extended pins 41 and 42, and these pins are pivotally held in hubs 43 and 44 of base members 45 and 46, the opposite ends of which are provided with sockets 47 and 48, similar to the base members 10.

With the parts arranged in this manner the back of the cassette is free to open to the flat position and as it approaches the full open position the anchoring base members 10 slide upwardly to the position shown in dotted lines in Figure 3.

In the cassette illustrated in Figures 9, 10 and 11, a frame 50 is provided with a double back having an inner plate 51 and an outer plate 52 that is spaced from the inner plate by spacers 53 and the plates are secured together by countersunk rivets 54. In this design the outer plate is formed with notches 55 in the edges for actuating the springs 56 which are pivotally held on pins 57. The edges of the outer plate are also relieved at the points 58 and 59 to provide access to the hinges 60 and 61, and a centrally positioned notch is also provided over the gripping ring 62, as indicated by the numeral 63.

In this design the hinge plates, to which the numerals 60 and 61 are applied, are provided with hubs 64 which receive bars 65 on hinge supports 66 which are similar to the corresponding elements 10 of the design shown in Figure 2, except that the hubs of the parts 10 are replaced by the bars 65, and the hubs are provided on the hinge plates instead.

The hinges may also be made as illustrated in Figure 12 wherein hinge plates 67 are bent around to provide hubs 68 in which bars 69 of supports 70, similar to the parts 10, are held.

The design shown in Figure 11 is similar to that shown in Figures 9 and 10, except that in large cassettes the edges of outer plates are cut straight instead of with notches. In this design the outer plate 71 is secured to an inner plate 72 with rivets 73 having spacers 74 thereon, and recesses 75 and 76 are provided at one end to provide access to the hinges 77 and 78, and a notch 79 is provided at the other end to provide access to the ring 80. The frame of this design is indicated by the numeral 81 and the back is held by springs 82 and 83 which are pivotally held on pins 84 and 85.

The X-ray cassette is used in an inverted position and with the back of my prior patent, and also as shown in Figures 1, 3 and 4, the intermediate part of the back is unsupported, and the weight of a patient, or as in industrial use, the weight of a casting or the like, upon the Bakelite causes the back to sag, which in turn presses the unsupported back away from the Bakelite causing poor contact all around and this results in a blurred image.

Using two plates as shown in Figure 10, the inner plate 51 is continually supported throughout the intermediate part from the outer plate 52, which rests on a flat surface so that it is prevented from bending or sagging by the outer plate and spacers 53. The inner plate and film, are therefore, held flat and against the under surface of the Bakelite plate of the cassette.

It will be understood that the double back of this invention may be used with hinges or frames of other types or designs, and also that the hinges of this invention may be used with backs or frames of other types.

It will also be understood that other modifications may be made in the design and arrangement of the parts without departing from the spirit of the invention.

What is claimed is:

1. In an X-ray cassette, the combination which comprises a rectangular shaped frame having side and end rails, each of said rails having a base flange with an outer wall perpendicular to the base flange and extended upwardly from the outer edge thereof, an upper panel, the width of which is less than that of the base flange parallel to and spaced from the base flange, an inner wall the width of which is less than that of the outer wall parallel to and spaced from the said outer wall and extended downwardly from the inner edge of the upper panel, an intermediate panel, the width of which is less than that of the upper panel spaced between and parallel to the upper panel and base flange extended outwardly from the lower edge of the said inner wall, and a back wall also spaced from and parallel to the said outer wall and extended from the outer edge of the intermediate panel to the base flange, a rectangular shaped X-ray transparent plate in the frame positioned with the edges thereof upon the inner parts of the said base flanges of the side and end rails of the frame, a rectangular shaped locking frame also having side and end rails positioned upon the said X-ray transparent plate and having a continuous recess in the upper surface of the periphery and positioned with the lower edge of the inner wall and the said intermediate panel of the frame in the said recess, a back within the said locking frame and positioned against the said X-ray transparent plate, suitable layers of padding positioned between the back and X-ray transparent plate, one of the side rails of the said locking frame having spaced notches therein, sliding hinge plates having vertically disposed bars positioned in the said notches of the rail of the locking frame and having horizontally disposed U-shape lower ends extended outwardly from the said bars and positioned against the inner surface of the back wall of the said rectangular shaped frame and between the said intermediate panel and base flange, and stationary hinge plates positioned upon the said inner plate and hingedly connected to the outer ends of the said sliding hinge plates.

2. In an X-ray cassette, the combination which comprises a rectangular shaped frame having side and end rails, each of said rails having a base flange with an outer wall perpendicular to the base flange and extended upwardly from the outer edge thereof, an upper panel, the width of which is less than that of the base flange parallel to and spaced from the base flange, an inner wall the width of which is less than that of the outer wall parallel to and spaced from the said outer wall and extended downwardly from the inner edge of the upper panel, said inner wall having spring bar receiving notches therein, an intermediate panel, the width of which is less than that of the upper panel spaced between and parallel to the upper panel and base flange extended outwardly from the lower edge of the said inner wall, and a back wall also spaced from and parallel to the said outer wall and extended from the outer edge of the intermediate panel to the base flange, a rectangular shaped X-ray transparent plate in the frame positioned with the edges thereof upon the inner parts of the said base flanges of the side and end rails of the frame, a rectangular shaped locking frame also having side and end rails positioned upon the said X-ray transparent plate and having a continuous recess in the upper surface of the periphery and positioned with the lower edge of the inner wall and the said intermediate panel of the frame in the said recess, an inner plate positioned within said locking frame, suitable layers of padding positioned between the said inner plate and X-ray transparent plate, a backing plate spaced from and parallel to the inner plate and positioned with the outer surface thereof in the same plane as that of the upper surface of the said upper panel of the frame, spacing posts positioned between the said inner and backing plates, spring bars positioned between the said inner and backing plates and positioned whereby the ends thereof extend into the notches of the side rails of the rectangular shaped frame, and means pivotally mounting the said spring bars in spaced relation and on the longitudinal center of the frame.

3. In an X-ray cassette, the combination which comprises a rectangular shaped frame having side and end rails, each of said rails having a base flange with an outer wall perpendicular to the base flange and extended upwardly from the outer edge thereof, an upper panel, the width of which is less than that of the base flange parallel to and spaced from the base flange, an inner wall the width of which is less than that of the outer wall parallel to and spaced from the said outer wall and extended downwardly from the inner edge of the upper panel, said inner wall having spring bar receiving notches therein, an intermediate panel, the width of which is less than that of the upper panel spaced between and parallel to the upper panel and base flange extended outwardly from the lower edge of the said inner wall, and a back wall also spaced from and parallel to the said outer wall and extended from the outer edge of the intermediate panel to the base flange, a rectangular shaped X-ray transparent plate in the frame positioned with the edges thereof upon the inner parts of the said base flanges of the side and end rails of the frame, a rectangular shaped locking frame also having side and end rails positioned upon the said X-ray transparent plate and having a continuous recess in the upper surface of the periphery and positioned with the lower edge of the inner wall and the said intermediate panel of the frame in the said recess, an inner plate positioned within said locking frame, suitable layers of padding positioned between the said inner plate and X-ray transparent plate, a backing plate spaced from and parallel to the inner plate and positioned with the outer surface thereof in the same plane as that of the upper surface of the said upper panel of the frame, spacing posts positioned between the said inner and backing plates, spring bars positioned between the said inner and backing plates and positioned whereby the ends thereof extend into the notches of the side rails of the rectangular shaped frame, means pivotally mounting the said spring bars in spaced relation and on the longitudinal center of the frame, one of the side rails of the said locking frame having spaced vertically disposed notches therein, sliding hinge plates having vertically disposed bars positioned in the said notches of the rail of the locking frame and having horizontally disposed U-shape lower ends extended outwardly from the said bars and positioned against the inner surface of the back wall of the said rectangular shaped frame and between the said intermediate panel and base flange, and stationary hinge plates positioned upon the said inner plate and hingedly connected to the outer ends of the said sliding hinge plates.

CHARLES B. KAMISS.

REFERENCES CITED

The following references are of record in the file of this patent:

UNITED STATES PATENTS

| Number | Name | Date |
| --- | --- | --- |
| 158,063 | Grimm | Dec. 22, 1874 |
| 388,409 | Grau | Aug. 28, 1888 |
| 803,509 | Ryan | Oct. 31, 1905 |
| 834,491 | Reily | Oct. 30, 1906 |
| 1,449,970 | Bucky | Mar. 27, 1923 |
| 1,466,198 | Sickinger | Aug. 28, 1923 |
| 1,507,727 | Buck | Sept. 9, 1924 |
| 2,303,147 | Tinnerman | Nov. 24, 1942 |